March 22, 1966

W. L. LEYDE 3,242,489

RADAR TRACKING APPARATUS

Filed March 4, 1964

2 Sheets-Sheet 1

FIG. I

INVENTOR.
WARREN L. LEYDE

BY Roger W. Vinson

ATTORNEY

INVENTOR.
WARREN L. LEYDE
BY Roger W. Jensen
ATTORNEY

United States Patent Office 3,242,489
Patented Mar. 22, 1966

3,242,489
RADAR TRACKING APPARATUS
Warren L. Leyde, Seattle, Wash., assignor to Honeywell
Inc., a corporation of Delaware
Filed Mar. 4, 1964, Ser. No. 349,225
5 Claims. (Cl. 343—7.3)

This invention pertains to improvements in system timing and more particularly to improvements in self-calibrating system sweep circuits.

This invention finds particular application as a self-calibrating sweep circuit for radar altimeters wherein the sweep circuit provides system timing and wherein any drift of the sweep circuit will produce system errors.

The invention comprises a circuit for comparing the output of the sweep circuit with a fixed predetermined reference level, the comparing circuit producing a gate output signal when the magnitude of the sweep signal equals the magnitude of the predetermined reference level. Simultaneous with the comparing of the sweep signal and the predetermined reference level, a dummy target signal is introduced into the radar altimeter system and the dummy target signal and the gate output signal of the comparing circuit are gated together in a coincidence circuit to produce an error signal proportional to any displacement of the sweep signal from the predetermined reference level. The error signal is utilized to adjust the sweep circuit in order to minimize the displacement of the sweep from the predetermined reference level.

It is one object of the invention, to provide an improved self-calibrating sweep circuit.

Another object of the invention is to provide a self-calibrating sweep circuit wherein an error signal, proportional to sweep error, is used to adjust the sweep circuit.

A further object of this invention is to provide a self-calibrating sweep circuit for use in a radar system utilizing an automatic track gate.

Figure 1:
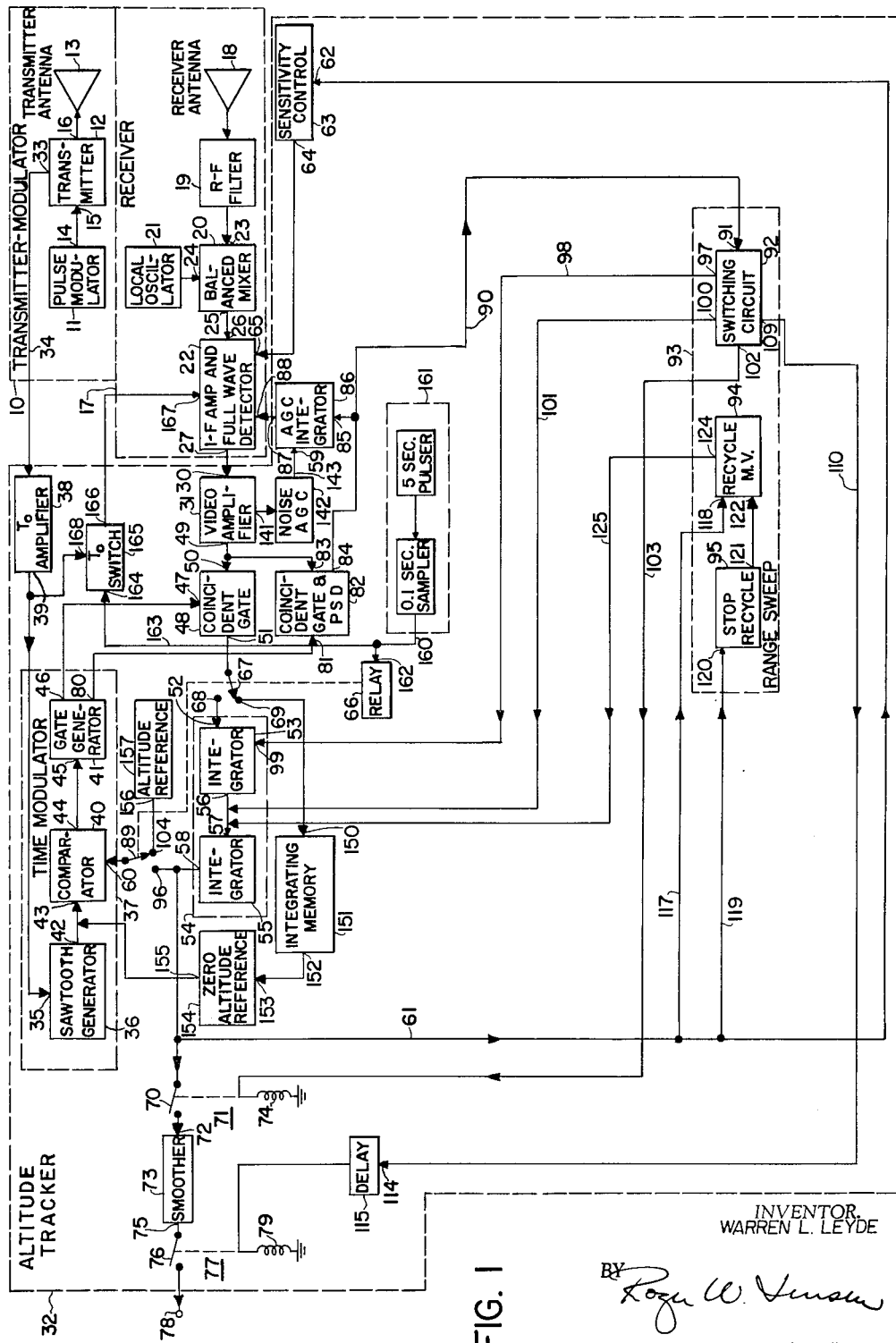
Figure 2:
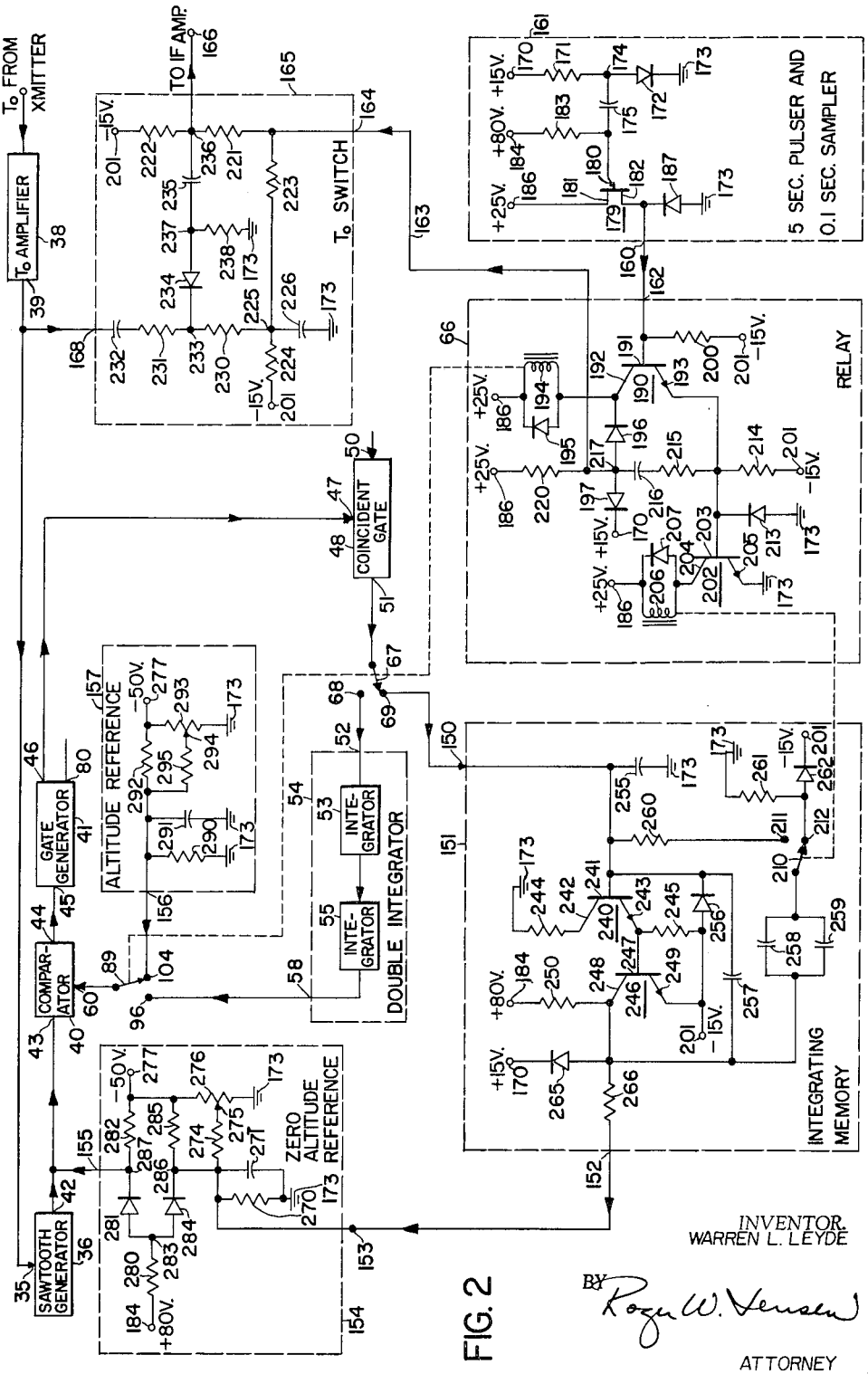

These and other objects of the invention will become apparent to those skilled in the art upon consideration of the accompanying specification, claims, and drawings, of which:

FIGURE 1 shows a block diagram of the radar altimeter system utilizing the present invention; and FIGURE 2 shows a schematic representation of the self-calibrating sweep portion of the radar altimeter system of FIGURE 1.

Referring to FIGURE 1, there is shown a transmitter-modulator unit 10 comprising a pulse modulator 11, a transmitter 12, and an antenna 13. An output 14 of pulse modulator 11 is connected to an input 15 of transmitter 12. An output 16 of transmitter 12 is connected to transmitter antenna 13. A receiver unit 17 comprises a receiver antenna 18, an RF filter 19, a balanced mixer 20, a local oscillator 21, and an IF amplifier and full wave detector 22.

Receiver antenna 18 is connected through RF filter 19 to an input 23 of balanced mixer 20. The output of the local oscillator 21 is connected to a second input 24 of the balanced mixer 20. An output 25 of balanced mixer 20 is connected to an input 26 of the IF amplifier and full wave detector 22. An output 27 of the IF amplifier and full wave detector 22 is connected to an input 30 of a video amplifier 31 in an altitude tracker 32.

A timing output 33 of transmitter 12 is connected by means of a conductor 34 to a $T_0$ timing pulse amplifier 38. An output 39 of amplifier 38 is connected to an input 35 of a sawtooth generator 36 of a time modulator 37. Time modulator 37 further includes a comparator 40, and a gate generator 41. An output 42 of sawtooth generator 36 is connected to a first input 43 of comparator 40, and an output 44 of comparator 40 is connected to an input 45 of gate generator 41.

A first output 46 of gate generator 41 is connected to a first input 47 of a coincident gate circuit 48. An output 49 of video amplifier 31 is connected to a second input 50 of coincident gate circuit 48. An output 51 of coincident gate circuit 48 is connected to a movable contact 67 of a relay 66. Relay 66 further has a fixed contact 68, a fixed contact 69, a movable contact 89, a fixed contact 96, and a fixed contact 104. Movable contact 67 of relay 66 operates between fixed contacts 68 and 69, while movable contact 89, of relay 66, operates between fixed contacts 96 and 104.

Fixed contact 68 of relay 66 is connected to an input 52 of a first integrator 53 of a double integrator 54. Double integrator 54 further includes a second integrator 55. An output 56 of first integrator 53 is connected to an input 57 of second integrator 55. An output 58 of second integrator 55 is connected to fixed contact 96 of relay 66, while movable contact 89 of relay 66 is connected to a second input 60 of the comparator 40.

Output 58 of integrator 55 is connected by means of a conductor 61 to an input 62 of a sensitivity control circuit 63. An output 64 of sensitivity control circuit 63 is connected to an input 65 of the IF amplifier 22 of receiver 17. Output 58 of integrator 55 is connected by means of a contact 70 of a relay 71 to an input 72 of a smoother circuit 73. Relay 71 further has a relay winding 74. An output 75 of smoother circuit 73 is connected by means of a relay contact 76 of a relay 77 to an altitude output terminal 78. Relay 77 further has a relay winding 79.

A second output 80 of gate generator 41 is connected to an input 81 of a coincident gate and peak sensing detector circuit 82. A second input 83 of coincident gate and peak sensing detector circuit 82 is connected to output 49 of video amplifier 31. An output 84 of coincident gate and peak sensing detector circuit 82 is connected to an input 85 of an AGC integrator 86. An output 87 of AGC integrator 86 is connected to an input 88 of the IF amplifier 22.

Output 84 of coincident gate and peak sensing detector circuit 82 is coupled by means of a conductor 90 to an input 91 of switching circuit 92 of the range sweep unit 93. Range sweep unit 93 further includes a recycle multivibrator 94 and a stop recycle circuit 95. A first output 97 of switching circuit 92 is connected by means of a conductor 98 to an inhibit input 99 of integrator circuit 53. An output 100 of switching circuit 92 is connected by means of a conductor 101 to the input 57 of integrator 55. An output 102 of switching circuit 92 is connected by means of a conductor 103 to relay winding 74 of relay 71. An output 109 of switching circuit 92 is connected by means of a conductor 110 to an input 114 of a delay circuit 115. The output of delay circuit 115 is connected to relay winding 79 of relay 77.

Output 58 of integrator 55 is connected by means of conductor 61 and conductor 117 to an input 118 of recycle multivibrator 94, and by means of conductor 61 and a conductor 119, to an input 120 of stop recycle circuit 95. An output 121 of stop recycle circuit 95 is connected to an input 122 of recycle multivibrator 94. An output 124 of recycle multivibrator 94 is connected by means of a conductor 125 to the input 57 of integrator 55.

An output 141 of video amplifier 31 is connected to the input of a noise automatic gain control circuit 142, and an output 143 of noice AGC circuit 142, is connected to an input 59 of an AGC integrator 86.

Fixed contact 69 of relay 66 is connected to an input 150 of an integrating memory circuit 151. An output 152 of integrating memory 151 is connected to an input 153 of a zero altitude reference 154. An output 155 of zero altitude reference 154 is connected to output 42 of sawtooth generator 36. Fixed contact 104 of relay 66 is connected to an output 156 of an altitude reference 157. An output 160 of a five second pulser and 0.1 second sample circuit 161 is connected to an input 162 of relay 66 and is further connected by means of a conductor 163 to an input 164 of a $T_0$ switch 165. An output 166 of $T_0$ switch 165 is connected to an input 167 of IF amplifier and full wave detector 22. Output 39 of $T_0$ amplifier 38 is connected to an input 168 of $T_0$ switch 165.

Operation of FIGURE 1

In considering the operation of the circuit of FIGURE 1, assume that relay 66 is deenergized; that is movable contact 67 is in engagement with fixed contact 68, and movable contact 89 is in engagement with fixed contact 96. With relay 66 deenergized, the operation of the circuit of FIGURE 1 is as follows: pulse modulator 11 generates nano second pulse width, one-thousand watt pulses at a ten kilocycle PRF. These pulses are fed from the output 14 of pulse modulator 11 to the input 15 of of the transmitter unit 12, where they drive a miniature re-entry cavity oscillator to one-hundred watts peak power. The output of transmitter 12 is fed to the transmitter antenna 13, and an RF energy pulse is radiated toward the target, in this case ground.

The reflected RF energy pulse is picked up by the receiver antenna 18, and is fed through RF filter 19 to the input 23 of the balanced mixer 20. The output of local oscillator 21 is fed to the input 24 of the balanced mixer 20. The ground return signal and the local oscillator signal are mixed in the balanced mixer, and an IF frequency is generated at the output 25 of the balanced mixer. This IF frequency is coupled to the input 26 of the IF amplifier and full wave detector stage 22. The IF signal is then amplified and detected and a video signal appears at the output 27 of the IF amplifier and full wave detector stage 22. This video signal is coupled to the video amplifier 31 where it is amplified. The output of video amplifier 31 is coupled to the noise automatic gain control circuit 142. The noise AGC circuit 142 senses the noise level on the video output line, and develops an output signal at its output terminal 143, which is proportional to this noise level. The output of the noise AGC circuit 142 is coupled through the automatic gain control integrator 86 to the input 88 of the IF amplifier and full wave detector 22, and it is used to hold the noise level on the video output to a prescribed level.

The amplified video signal appears at the output 49 of video amplifier 31, and is coupled to the input 50 of coincident gate circuit 48 and to the input 83 of coincident gate and peak sensing detector circuit 82.

Each time the transmitter 12 fires, a timing pulse appears at transmitter output terminal 33, and is coupled through conductor 34 and to amplifier 38 to the input 35 of sawtooth generator 36. This timing pulse initiates the generation of a sawtooth signal, which appears at the output 42 of sawtooth generator 36, and is coupled to the input 43 of comparator 40. The output appearing at terminal 58 of the double integrator 54 is coupled through fixed contact 96 and movable contact 89 of relay 66, to the input 60 of comparator 40. When the instantaneous magnitude of the sawtooth input to comparator 40 is equal to the magnitude of the output of double integrator 54, a signal will appear at output terminal 44 of comparator 40, and will be coupled to the input terminal 45 of gate generator 41.

This input to gate generator 41 causes a first and a second gate signal to appear at the gate generator on output terminals 46 and 80, respectively. The first gate output, called the track gate, is coupled from output 46 of gate generator 41 to the input terminal 47 of coincident gate circuit 48, while the second gate output, called the track automatic gain control (TAGC) gate, appears at output terminal 80 of gate generator 41, and is coupled to the input terminal 81 of coincident gate and peak sensing detector circuit 82. The trailing edge of the TAGC gate, appearing at output terminal 80 of gate generator 41, is delayed in time by a predetermined amount with respect to the trailing edge of the track gate appearing at output terminal 46 of gate generator 41. The track gate input to terminal 47 of coincident gate circuit 48 enables the coincident circuit 48 during the leading edge of the video pulse, coupled through input 50 of coincident gate circuit 48, and thereby allows an output signal proportional to the leading edge of the video signal to appear at terminal 51 of coincident gate circuit 48. The output signal from coincident gate circuit 48 is coupled through movable contact 67 and fixed contact 68 of relay 66 to the input 52 of integrating circuit 53. This signal is integrated in integrator 53, and is coupled from the output 56 of integrator 53 to the input 57 of integrator 55. The signal at the output 56 of integrator 53 is proportional to the rate of change of altitude. As mentioned previously, this signal is coupled to the input 57 of integrator 55 where it is integrated. Since the input signal of integrator 55 is proportional to the rate of change of altitude, the output signal appearing at output 58 of integrator 55 will be proportional to altitude. This signal is coupled through relay contact 70 to the input terminal 72 of smoother circuit 73. This signal is then smoothed in the smoother circuit, and appears as a D.C. level at the output 75 of smoother circuit 73. This altitude signal is coupled through a relay contact 76 to altitude output terminal 78.

As mentioned previously, the altitude signal appearing at output terminal 58 of integrator 55 is also coupled to fixed contact 96 and movable contact 89 of relay 66 to the input terminal 60 of comparator 40. The magnitude of the altitude signal determines at which point an output will appear at the output 44 of comparator 40, and hence the time at which gate generator 41 will generate the track gate and the TAGC gate.

The TAGC gate, which is fed to the input 81 of coincident gate and peak sensing detector circuit 82 from the output 80 of generator 41, enables the gate circuit 82. When gate circuit 82 is enabled, the video signal appearing at its input 83 is fed through the circuit and an output signal appears at output terminal 84, which is proportional to the peak amplitude of the video signal.

The output signal at terminal 84 of coincidence gate and peak sensing detector circuit 82 is coupled to the input 85 of the AGC integrator 86. The signal is integrated in integrator 86 and is coupled from integrator output terminal 87 to the input terminal 88 of the IF amplifier and full wave detector circuit 22, and controls the gain of the IF amplifier so as to hold the magnitude of the video pulses constant.

The output of terminal 84 of coincidence gate and peak sensing detector 82 is further coupled by means of conductor 90 to the input 91 of switching circuit 92, thereby operating switching circuit 92 to its first state. When switching circuit 92 is in its first state, an output appears at output terminal 102, and is coupled through conductor 103 to relay winding 74 of relay 71, energizing the winding and thereby closing the relay contact 70. Furthermore, an output appears at output terminal 109 of switching circuit 92, and is coupled by means of conductor 110, and delay circuit 115, to relay winding 79 of relay 77, thereby energizing winding 79, and closing relay contact 76. As explained previously, when relay contacts 70 is closed, the altitude output of the double integrator 54 is coupled to the input of smoother circuit 73, and when relay contact 76 is closed, the output of smoother circuit 73, or in other words, the altitude signal, is connected to altitude output terminal 78.

Assume now that the track gate and the TAGC gate from the output of gate generator 41 lose track of the video pulse. In other words, assume that the track gate appearing at input 47 of coincident gate 48 is not coincident with the video pulse applied to input 50 of coincident gate circuit 48, and similarly, the TAGC gate applied at input 81 of coincident gate peak sensing detector circuit 82 is not coincident with the video pulse supplied to input 83 of gate circuit 92. In this situation, there will be no output from either coincident gate circuit 48 or coincident gate and peak sensing detector circuit 82, and hence, it becomes necessary for the altimeter to switch over to a search mode so as to re-establish coincidence between the tracking gates and the video pulse.

This searching operation is accomplished as follows: When coincidence between the TAGC gate and the video pulse is lost, there will be no output from the coincident gate and peak sensing detector circuit 82, and hence, there will be no input signal at terminal 91 of switching circuit 92. Therefore, switching circuit 92 switches to a second operating state.

When switching circuit 92 is in its second operating condition, there will be an output at output terminal 97, which is coupled through conductor 98 to an input 99 of integrator 53, thereby inhibiting integrator 53. At the same time that integrator 53 is inhibited, a substantially step function signal appears at output terminal 100 of switching circuit 92, and is coupled through conductor 101 to the input 57 of integrator 55. This substantially step function input to integrator 55 is integrated, and sweeps the output signal of integrator 55 to its positive limit. The output 58 of integrator 55 is coupled through conductor 61 and conductor 117 to the input 118 of recycle multivibrator 94. When the output signal of integrator 55 reaches this positive limit, recycle multivibrator 94 changes state, and a substantially step function output appears at recycle multivibrator output 124. This signal is coupled through conductor 125 to the input 57 of integrator 55. This substantially step function signal is an opposite polarity to the step function output signal of switching circuit 92, and this signal is integrated in integrator 55 and drives the output of integrator 55 to its negative limit. The output 58 of integrator 55 is connected by means of conductor 61 and conductor 119 to the input 120 of the stop recycle circuit 95. As the output signal of integrator 55 reaches its negative limit, a signal appears at output 121 of stop recycle circuit 95, and is coupled to input 122 of recycle multivibrator 94, thereby resetting recycle multivibrator 94. When recycle multivibrator 94 is reset, the step input signal disappears from recycle multivibrator output 124, and the step function output signal from switching circuit 92 again controls the operation of integrator 55, and tends to drive the output signal of the integrator toward its positive limit once more.

As the output signal of double integrator 54 sweeps over its range from the positive limit to the negative limit, the point at which the instantaneous magnitude of the sawtooth wave form applied to input terminal 43 of comparator 40, equals the magnitude of the output of the double integrator 54 applied to input 60 of comparator 40, varies, and hence, the time at which the signal appears on output terminal 44 of comparator 40, also varies. Since the output of comparator 40 controls the time at which the gate generator 41 generates the track gate and the TAGC gate, the times of these gates also varies, and these gates are effectively swept continuously up and back through substantially the limit of the altimeter range. At some point during the searching operation, the track gate and the TAGC gate intercept the video pulse from the output of video amplifier 31. At this time, the track gate applied to terminal 47 of coincident gate circuit 48 is coincident with the video pulse applied to input terminal 50 of coincident gate circuit 48, and hence an output appears at output terminal 51. Similarly, the TAGC gate applied to terminal 81 of the coincident gate and peak sensing detector circuit 82 is coincident with the video pulse applied to input terminal 83, and hence an output once again appears at output terminal 84. As explained previously, the output on terminal 84 of coincident gate and peak sensing detector circuit 82 will switch switching circuit 92 to its first mode of operation and the altimeter will return to the track mode.

When the altimeter changes from its track mode of operation to its search mode of operation, the switching circuit 92 changes from its first mode to its second mode of operation, the output at output terminal 102 of switching circuit 92, which engages relay winding 74 of relay 71, is not immediately removed, but rather, there is a short time delay before relay winding 74 is deenergized. The purpose of this short time delay is to prevent the smoother circuit from being disconnected from the output of double integrator 54 in the event that there is a momentary loss of coincidence between the track gate and the TAGC gate and the video signal. Similarly, when switching circuit 92 changes from its first mode of operation to its second mode of operation, and the output signal at output terminal 109 of switching circuit 92 disappears, delay circuit 115 prevents the immediate deenergization of relay winding 79 of relay 77. The delay circuit 115 which inhibits the de-energization of relay winding 79 is substantially longer than the delay in switching circuit 92 which inhibits the de-energization of relay winding 74.

Smoother circuit 73 contains a memory, and hence this circuit will remember the aircraft's altitude at the moment that relay winding 74 is de-energized, and relay contact 70 opens thereby disconnecting smoother circuit 73 from the output of the double range integrator 54.

If the searching circuits of the altimeter are unable to re-establish coincidence between the video signal and the track gate and TAGC gate during the delay time of delay 115, then relay winding 79 will be de-energized, and relay contact 76 will open, thereby removing the altitude signal from the altitude output terminal 78. When the altitude signal is removed from terminal 78 an indicator will light thereby indicating to the pilot of the aircraft that the altimeter is in the search mode. As soon as coincidence is re-established between the video signal and the track gate and TAGC gate, relay windings 74 and 79 will again be energized and the altitude indicator will indicate the present altitude.

Once every five seconds, the five second pulser and 0.1 second sampler 161 produces an output pulse at output 160 which is coupled to input 162 of relay 66 and which energizes relay 66 for 0.1 second. When relay 66 is energized, movable contact 67 will be in contact with fixed contact 69 and movable contact 89 will be in contact with fixed contact 104. The output from the five second pulser and 0.1 second sampler 161, is also coupled through conductor 163 to the input 164 of $T_0$ switch 165 thereby enabling $T_0$ switch 165. The $T_0$ pulse from $T_0$ amplifier 38 is coupled to input 168 of $T_0$ switch 165 and an output appears at output 166 of $T_0$ switch 165, which is coupled to input 167 of IF amplifier and full wave detector 22, thereby inserting a dummy target signal into the IF amplifier. This dummy IF signal is fed through video amplifier 31 to coincident gate 48. The operation of movable contact 89 into engagement with fixed contact 104 of relay 66, connects the output of the altitude reference circuit 157 to input 69 of comparator 40. The signal from altitude reference circuit 157 is preset to a value corresponding to a reference altitude which in this embodiment is near zero altitude. Since the $T_0$ signal from transmitter 12 initiates sawtooth generator 36, and since the signal from the altitude reference circuit 157 is equal to the reference altitude, the output from comparator 40, and hence the generation of the track gate and the TAGC gate should occur in correct relationship to the reference altitude at a time near zero time. The track gate from the output 46 of gate generator 41, is fed to input 47 of coincident gate circuit 48 and tracks the dummy target injected into the IF amplifier and full wave detector 22. If the track gate is displaced with respect to the dummy signal, an error current is generated. This current is integrated by the integrating memory circuit 151, and the output of integrating memory 151 is fed to the input 153 of the zero altitude reference 154, and is used to rezero the system. Long-term drifts in the comparison circuitry and in the internal timing functions are removed by this loop. After 0.1 second, the output signal from the five second pulser and 0.1 second sampler circuit 161, disappears and relay 66 is deenergized. When relay 66 is deenergized, movable contact 67 again makes contact with fixed contact 68 and movable contact 89 again makes contact with contact 96 and the altimeter is back in its normal mode of operation.

Structure of FIGURE 2

FIGURE 2 shows a schematic representation of the circuitry of various circuits shown in block diagram form in FIGURE 1.

Referring to FIGURE 2 there is shown the five second pulser and 0.1 second sampler 161, which comprises a fifteen volt positive potential source 170 connected by means of a resistor 171 in series with a diode 172 to ground 173. The junction 174 between resistor 171 and diode 172 is connected by means of a capacitor 175 to an emitter 180 of a unijunction transistor 179. Unijunction transistor 179 further has a base 181 and a base 182. Emitter 180 of unijunction transistor 179 is further connected by means of a resistor 183 to an eighty volt source of positive potential 184. Base 181 of unijunction transistor 179 is connected directly to a twenty-five volt positive potential source 186, while base 182 of unijunction transistor 179 is connected by means of a reversed poled diode 187 to ground 173, and is further directly connected to output 160 of the five second pulser and 0.1 second sampler 161.

Output 160 of five second pulser and 0.1 second sampler 161 is connected directly to input 162 of relay 66. Input 162 of relay 66 is connected directly to a base 191 of a transistor 190. Transistor 190 further has a collector 192 and an emitter 193. Collector 192 of transistor 190 is connected by means of a relay winding 194 in parallel with a diode 195 to the positive potential source 186, and by means of a reverse poled diode 196 in series with a diode 197 to the fifteen volt positive potential source 170. Base 191 of transistor 190 is connected by means of a resistor 200 to a negative 15 volt potential source 201. Emitter 193 of transistor 190 is directly connected to a base 203 of a transistor 202. Transistor 202 further has a collector 204, and an emitter 205. Emitter 205 of transistor 202 is connected directly to ground 173, while collector 204 of transistor 202 is connected by means of a relay winding 206 in parallel with a diode 207 to the twenty-five volt positive potential source 186.

Relay winding 194 operates movable contact 67 between fixed contacts 68 and 69 and movable contact 89 between fixed contacts 96 and 104, while relay winding 206 operates a movable contact 210 between a fixed contact 211 and a fixed contact 212. Base 203 of transistor 202 is connected by means of a reverse poled diode 213 to ground 173, and is further connected by means of a resistor 214 to the negative fifteen volt potential source 201. Base 203 is further connected by means of a resistor 215 in series with a capacitor 216 to a junction 217 between diodes 196 and 197. Junction 217 is connected by means of a resistor 220 to the positive twenty-five volt potential source 186, and is further connected by means of conductor 163 to the input 164 of T₀ switch 165.

Input 164 of T₀ switch 165 is connected by means of a resistor 221 in series with a resistor 222 to the negative fifteen volt potential source 201, and by means of a resistor 223 in series with a resistor 224 to the negative fifteen volt potential source 201. A junction 225 between resistors 223 and 224 is connected by means of a capacitor 226 to ground 173, and by means of a series circuit comprising a resistor 230, a resistor 231, and a capacitor 232, to the input 168 of T₀ switch 165. Input 168 of T₀ switch 165 is connected to the output 39 of T₀ amplifier 38, as is shown in FIGURE 1.

A junction 233 between resistors 230 and 231 is connected by means of a reversed poled diode 234 in series with a capacitor 235 to a junction 236 between resistors 221 and 222. Junction 236 is connected to output 166 of T₀ switch 165. A junction 237, between diode 234 and capacitor 235, is connected to ground 173 by means of a resistor 238.

As explained in the description of FIGURE 1, fixed contact 69 of relay 66 is connected to the input 150 of integrating memory circuit 151. Input 150 of integrating memory circuit 151 is connected directly to a base 241 of a transistor 240. Transistor 240 further has a collector 242 and an emitter 243. Collector 242 of transistor 240 is connected to ground 173 by means of a resistor 244, while emitter 243 of transistor 240 is connected to the negative fifteen volt potential source 201 by means of a resistor 245, and is further directly connected to a base 247 of a transistor 246. Transistor 246 further has a collector 248 and an emitter 249. Emitter 249 of transistor 246 is connected directly to the negative fifteen volt potential source 201, while collector 248 of transistor 246 is connected by means of a resistor 250 to the positive eighty volt potential source 184.

Base 241 of transistor 240 is connected by means of a capacitor 255 to ground 173, and by means of a reverse poled diode 256 to the negative 15 volt potential source 201. Collector 248 of transistor 246 is connected by means of a capacitor 257 to the base 241 of transistor 240, and by means of a capacitor 258 in parallel with a capacitor 259 to the movable relay contact 210 associated with winding 206 of relay 66. Fixed contact 211 of relay winding 206 of relay 66 is connected by means of a resistor 260 to the base 241 of transistor 240, while fixed contact 212, associated with winding 206 of relay 66, is connected by means of a resistor 261 to ground 173, and by means of a diode 262 to the negative fifteen volt potential source 201. Collector 248 of transistor 246 is further connected by means of a diode 265 to the positive fifteen volt potential source 170, and by means of a resistor 266 to the output terminal 152 of integrating memory circuit 151. Output terminal 152 of integrating memory circuit 151 is directly connected to the input terminal 153 of the zero altitude reference circuit 154.

Input 153 of zero altitude reference circuit 154 is connected to ground 173 by means of a resistor 270 in parallel with a capacitor 271, and is further connected by means of a resistor 274 to an arm 275 of a potentiometer 276. Potentiometer 276 is connected from a negative fifty volt potential source 277 to ground 173.

The positive eighty volt potential source 184 is connected by means of a resistor 280, a diode 281, and a resistor 282 to the negative fifty volt potential source 277. A junction 283 between resistor 280 and diode 281 is connected by means of a diode 284 in series with a resistor 285 to the negative fifty volt potential source 277. A junction 286 between diode 284 and resistor 285 is connected to input terminal 153 of zero altitude reference circuit 154, while a junction 287 between diode 281 and resistor 282 is connected to output terminal 155 of zero altitude reference circuit 154. As explained previously in conjunction with the operation of FIGURE 1, output 155 of zero altitude reference 154 is connected to output 42 of sawtooth generator 36, and controls the bias level for the sawtooth sweep signal.

Fixed contact 104, associated with relay winding 194 of relay 66, is connected to output 156 of the altitude reference circuit 157. Output 156 of altitude reference circuit 157 is further connected by means of a resistor 290 in parallel with a capacitor 291 to ground 173, and is further connected by means of a resistor 292 to the negative fifty volt potential source 277. Potential source 277 is further connected by means of a potentiometer 293 to ground 173. An arm 294 of potentiometer 293 is connected by means of a resistor 295, to output terminal 156 of altitude reference circuit 157.

*Operation of FIGURE 2*

As described in conjunction with the description of FIGURE 1, relay 66 is normally deenergized, that is, transistors 190 and 202 are normally nonconducting so that relay windings 194 and 206, in the collector circuits of transistors 190 and 202 respectively, are normally deenergized. During this mode of operation, movable contact 67 will be in engagement with fixed contact 68, movable contact 89 will be in engagement with fixed contact 96, and movable contact 210 will be in engagement with fixed contact 211.

Referring to the five second pulser and 0.1 second sampler 161, a current will flow from the positive 80 volt potential source 184 through resistor 183, capacitor 175, and diode 172 to ground 173, thereby charging capacitor 175. When capacitor 175 is sufficiently charged, unijunction transistor 179 will conduct, and a current will flow from the positive twenty-five volt potential source 186 through base 181 to base 182 of unijunction transistor 179, output terminal 160 of the pulser and sampler circuit 161, input terminal 162 of relay 66, base 191 to emitter 193 of transistor 190, and base 203 to emitter 205 of transistor 202 to ground 173. This current flow, through the base-emitter junctions of transistors 190 and 202, causes these transistors to conduct. The time required for capacitor 175 of five second pulser and 0.1 second sampler circuit 161 to charge is approximately five seconds.

When transistor 190 conducts, a current will flow from the positive twenty-five volt potential source 186 to relay winding 194, collector 192 to emitter 193 of transistor 190, and the parallel circuit of the base emitter junction of transistor 202 to ground 173 and resistor 214 to the negative fifteen volt potential source 201. This current flow through relay winding 194 energizes the relay and causes movable contact 67 to move into engagement with fixed contact 69, and movable contact 89 to move into engagement with fixed contact 104. When transistor 202 conducts, a current will flow from the positive twenty-five volt potential source 186 through relay winding 206, and collector 204 to emitter 205 of transistor 202 to ground 173, thereby energizing relay winding 206 and causing movable contact 210 to move into engagement with fixed contact 212.

When transistor 190 of relay circuit 66 is non-conducting, output conductor 163 is held at a positive potential by the positive potential sources 186 and 170. This positive potential is coupled to input 164 of the $T_0$ switch 165, and causes diode 234 to be back-biased. The $T_0$ pulse from transmitter 12 applied to $T_0$ amplifier 38 is a positive pulse, and this pulse is amplified and inverted in amplifier 38, and appears as a negative going pulse at the output 39 of $T_0$ amplifier 38. The negative going $T_0$ timing pulse is coupled to input 35 of sawtooth generator 36, and starts the generation of the sawtooth sweep signal from sawtooth generator 36. In addition, the negative going $T_0$ timing signal is coupled to input 168 of $T_0$ switch 165. However, since diode 234 is backbiased by the positive potential applied to input 164 of switch 165, the negative timing pulse is inhibited from appearing at output 166 of $T_0$ switch 165.

When transistor 190 of relay circuit 66 conducts, a current will flow from the positive twenty-five volt potential source 186 to resistor 220, diode 196, collector 192 to emitter 193 of transistor 190, and resistor 214 to the negative fifteen volt potential source 201. The conduction of transistor 190 causes a negative going signal to appear at the output conductor 163 and this negative signal is coupled to input 164 of $T_0$ switch 165, and forward biases diode 234. When the $T_0$ timing signal appears at the output 39 of $T_0$ amplifier 38, it is coupled to input 168 of $T_0$ switch 165 and is coupled through diode 234 and appears at the output terminal 166 of switch 165. From output terminal 166 it is coupled to the IF amplifier and full wave detector circuit 22 in the receiver portion of the altimeter and causes a dummy target signal to be injected into the IF amplifier. This dummy target signal produces a video output pulse which is amplified in video amplifier 31 and is fed to input 50 of coincident gate 48.

Since relay 66 is energized, movable contact 89 is now in engagement with fixed contact 104, and the input 60 of comparator 40 is connected to the output 156 of the altitude reference circuit 157. The potential at the output 156 of the altitude reference circuit 157 corresponds to the potential that would appear at the output 58 of double integrator 54 if the altimeter were at zero altitude. The altitude reference signal can be adjusted by adjusting the arm 294 of potentiometer 293. The actual magnitude of the altitude reference signal will be determined by the particular installation of the altimeter circuit.

The $T_0$ timing pulse from $T_0$ amplifier 38 that produces the dummy target signal in the IF amplifier also is fed to input 35 of sawtooth generator 36, and initiates the generation of the sawtooth sweep signal. The sawtooth sweep signal appears at output 42 of sawtooth generator 36, and is fed to input 43 of comparator 40 where it is compared with the signal from the altitude reference signal 157. When the magnitude of the sawtooth sweep signal equals the magnitude of the altitude reference signal, an output will appear at output 44 of comparator 40, and will be fed to the input 45 of gate generator 41 where it will cause the track gate to be generated. The track gate signal will appear at output 46 of gate generator 41, and will be fed to input 47 of coincident gate circuit 48 where it will track the dummy target signal appearing at input 50 of coincident gate circuit 48. If the track gate is displaced with respect to the dummy target signal, an error current is generated. Since relay 66 is energized, movable contact 67 is now engaging fixed contact 69, and the error current from coincident gate 48 is coupled to the input 150 of the integrating memory circuit 151. This error current is integrated by integrating memory 151, and the integrated error signal appears at the collector 248 of transistor 246. Since relay 66 is energized, movable contact 210 will now be in engagement with fixed contact 212, and the error signal appearing on the collector 248 of transistor 246 will be stored in the large storage capacitors 258 and 259.

Again referring to the five second pulse and 0.1 second sampler circuit 161, when unijunction transistor 179 conducts, capacitor 175 will discharge through the emitter 180 to base 182 of unijunction transistor 179, base 191 to emitter 193 of transistor 190, base 203 to emitter 205 of transistor 202, ground 173, the positive fifteen volt potential source 170, and resistor 171, to the other side of capacitor 175. The discharge time for capacitor 175 is approximately 0.1 second. After capacitor 175 is discharged, unijunction transistor 179 ceases conduction and hence, transistors 190 and 202 in relay circuit 66, also become nonconducting and relay windings 194 and 206, respectively, are de-energized. When relay windings 194 and 206 are de-energized, the relay contacts assume their original positions, that is, movable contact 67 is in engagement with fixed contact 68, movable contact 89 is in engagement with fixed contact 96, and movable contact 210 is in engagement with fixed contact 211. When the relay 66 is de-energized, the error signal stored in the large storage capacitors 258 and 259 of integrating memory 151, drains off very slowly, and hence, this error signal appears as a D.C. level variation at output 152 of integrating memory 151. This signal is coupled to input 153 of the zero altitude reference circuit 154, and varies the D.C. operating level of the zero altitude reference circuit 154 so that the reference level at output 155 varies. Since the D.C. level at output 155 determines the level at which the sawtooth sweep rides, a variation in this level causes the instantaneous magnitude of the sawtooth sweep to equal the magnitude of the output of double integrator 54 applied to input 60 of comparator 40, either earlier or later in time, depending upon whether the bias level at output 155 of zero altitude reference 154 has increased or decreased. In this manner, any variations in the start of the sawtooth sweep from a zero time, are eliminated.

Every five seconds the five second pulser will again energize the relay 66 for 0.1 second and will cause the zero time of the sawtooth generator 36 to be recalibrated.

It is to be understood that while I have shown a specific embodiment of my invention, that this is for the purpose of illustration only, and that my invention is to be limited solely by the scope of the appended claims.

I claim:
1. A distance measuring system comprising:
   transmitter means for transmitting an energy pulse to a reflecting object;
   receiver means for receiving said energy pulse after said pulse has reflected from said object;
   sweep generating means energized in synchronism with the output of said transmitter means;
   comparator means;
   means connecting the output of said sweep generating means to said comparator means;
   gate generating means;
   means connecting the output of said comparator means to said gate generating means;
   coincident gate means;
   means connecting said coincident gate means to the output of said receiver means said coincident gate means further having an enabling input;
   means connecting the output of said gate generating means to said enabling input of said coincident gate means;
   double integrating means;
   means connecting the output of said coincident gate means to the input of said double integrating means;
   means connecting the output of said double integrating means to said comparator means;
   integrating memory means;
   a reference signal source;
   switch means connected to periodically switch the output of said coincident gate means from the input of said double integrator to the input of said integrating memory means and the input of said comparator means from the output of said double integrator to the output of said reference signal source, and to simultaneously apply a dummy reflected energy pulse to said receiver means;
   and, means connecting the output of said integrating memory means to said sweep generating means to control the bias level of the sweep signal.

2. A distance measuring device comprising:
   time modulator means responsive to a first signal and operable to produce a gate output a known time after the occurrence of said first signal;
   coincident gate means connected to receive a second signal;
   means connecting the gate output from said time modulator means to said coincident gate means;
   double integrating means connected to the output of said coincident gate means;
   means connecting the output of said double integrating means to said time modulator means to control the position of said gate output whereby the gate output is repositioned to follow any changes in the time between the occurrence of said first signal and said second signal;
   integrating memory means;
   a reference signal source;
   switch means connected to periodically switch the output of said coincident gate means from the input of said double integrating means to the input of said integrating memory means and the time modulator from the output of said double integrating means to said reference signal source, and to simultaneously apply a dummy first signal to said time modulation means; and,
   means connecting the output of said integrating memory means to said time modulator means to control the starting time at which said gate is generated.

3. In a distance measuring system having a transmitter for transmitting an energy pulse to a reflecting object, a receiver for receiving said energy pulse after said pulse has reflected from said object, sweep generating means for timing the system and wherein any drift of the sweep signal will produce system errors, and a track loop for tracking the reflected energy pulse, the improvement comprising:
   means for periodically interrupting the track loop for a predetermined time period;
   means for introducing a dummy reflected energy pulse into said receiver during said predetermined time period;
   means for comparing the output of said sweep generating means with a fixed reference to produce a gate signal during said predetermined time period;
   means for gating the gate signal and the dummy reflected energy signal during said predetermined time period to produce an error signal proportional to the displacement of the sweep signal from a predetermined reference level;
   and, means responsive to said error signal for adjusting said sweep generating means.

4. In a distance measuring system having a sweep circuit for timing the system and wherein any drift of the sweep circuit from a zero start time will produce system errors, the improvement comprising:
   means for introducing a dummy target signal into the system at substantially time zero;
   means for comparing the output of said sweep circuit to a value corresponding to a reference distance to produce a gate substantially at time zero;
   means for gating the time zero gate and the dummy target signal to produce an error signal proportional to the displacement of the sweep signal from time zero;
   and, means responsive to said error signal for rezeroing said sweep circuit.

5. In a system having a sweep circuit for timing the system and wherein any drift of the sweep circuit will produce system errors, the improvement comprising:
   means for introducing a dummy signal into the system;
   means for comparing the output of said sweep circuit with a fixed reference to produce a gate signal;
   means for gating the gate signal and the dummy signal to produce an error signal proportional to the displacement of the sweep signal from a predetermined reference level;
   and, means responsive to said error signal for adjusting said sweep circuit to minimize drift errors.

No reference cited.

CHESTER L. JUSTUS, *Primary Examiner.*

LEWIS H. MYERS, *Examiner.*

T. H. TUBBESING, *Assistant Examiner.*